(12) United States Patent
Li et al.

(10) Patent No.: US 7,452,484 B2
(45) Date of Patent: Nov. 18, 2008

(54) INORGANIC PHOSPHOR AND METHOD FOR MANUFACTURING THE SAME

(75) Inventors: Yuan-Yao Li, Chia-Yi (TW); Kuo-Min Lin, Wuci Township, Taichung County (TW)

(73) Assignee: National Chung Cheng University, Chai-Yi (TW)

( * ) Notice: Subject to any disclaimer, the term of this patent is extended or adjusted under 35 U.S.C. 154(b) by 339 days.

(21) Appl. No.: 11/471,524

(22) Filed: Jun. 21, 2006

(65) Prior Publication Data

US 2007/0108412 A1 May 17, 2007

(30) Foreign Application Priority Data

Nov. 15, 2005 (TW) .............................. 94140047 A (51) Int. Cl.
*C09K 11/08* (2006.01)
*C09K 11/66* (2006.01)
*C09K 11/56* (2006.01)
*C09K 11/02* (2006.01)
*C09K 11/88* (2006.01)

(52) U.S. Cl. .................... 252/301.4 F; 252/301.4 S; 252/301.4 R (58) Field of Classification Search ........... 252/301.4 S, 252/301.4 F
See application file for complete search history.

(56) References Cited

OTHER PUBLICATIONS

Pang. Luminescent properties of Gd2Ti2O7:Eu3+ phosphor films prepared by sol gel process. Materials Research Bulletin. vol. 39, Issue 11, Sep. 1, 2004, pp. 1607-1614.*

* cited by examiner

*Primary Examiner*—Jerry Lorengo
*Assistant Examiner*—Matthew E Hoban
(74) *Attorney, Agent, or Firm*—Rosenberg, Klein & Lee (57) ABSTRACT

An inorganic phosphor and a method for manufacturing the same are proposed. The sol-gel method is used and the elements vanadium and sulfate are added to synthesize a red-emission gadolinium titanium oxide phosphor doped with $Eu^{3+}$, V and S to change the original red/orange-emission property and enhance the red-emission intensity. Moreover, the elements vanadium and sulfate replace the rare-earth $Eu^{3+}$ element as active sites to obtain a white-emission gadolinium titanium oxide phosphor doped with V and S. Using this single-kind phosphor, white light can be emitted under the excitation of violet light without the need of mixing multiple colors.

17 Claims, 15 Drawing Sheets

CIE

INORGANIC PHOSPHOR AND METHOD FOR MANUFACTURING THE SAME

FIELD OF THE INVENTION

The present invention relates to an inorganic phosphor and a method for manufacturing the same and, more particularly, to a red-emission phosphor (gadolinium titanium oxide doped with $Eu^{3+}$, V and S, i.e., $Gd_2Ti_2O_7$: $Eu^{3+}$, V, S) and a white-emission phosphor (gadolinium titanium oxide doped with V and S, i.e., $Gd_2Ti_2O_7$: V, S) and a method for manufacturing the same.

BACKGROUND OF THE INVENTION

With continual progress of the optoelectronic technology, the requirement of people for displays has become more and more stringent. Compact flat displays have gradually replaced conventional bulky cathode ray tube (CRT) displays. As for the illumination light source, power-saving LEDs have become the mainstream, and the key material (phosphor) of the light source is under rigorous research. Phosphor is also called fluorescent material or light emitting material, which is excited by energy of different form to convert the absorbed energy into visible lights by means of non-thermal radiation.

Phosphor can generally be categorized into two types: organic phosphor and inorganic phosphor. The inorganic phosphor includes a light emitting center formed of a host and appropriate activators. At present, the host primarily used by manufacturers is generally a II-VI compounds such as an ionic compound formed of Ca, Sr, Ba (IIA group) or Zn, Cd, Hg (IIB group) and S, Se (VIA group). The activators are generally Mn, Cu, Ag, lanthanide-series elements, and transition metals such as Eu, Sm and rare earth elements. For instance, when gadolinium titanium oxide having semiconductor properties is added with rare earth element $Eu^{3+}$, it becomes slightly fluorescent, and the emission wavelengths are 590 nm and 615 nm.

Nowadays, white-emission illumination light sources are the most appreciated emerging products all over the world. The earliest technology for manufacturing white-emission light sources is developed by Nichia, Japan to produce white light by mixing two wavelengths. In the method developed by Nichia, Japan, a layer of yttrium-aluminum-garnet (YAG) phosphor is coated on a 460 nm blue light emitting die. The YAG phosphor is excited by a blue LED to produce a 550 nm yellow light complementary to the blue light. By means of the principle of lens, the complementary white and blue lights are mixed to obtain the desired white light. This method has a lower manufacturing cost, and the power circuit structure is simpler.

Because Nichia, Japan has the patent of the above manufacturing technology in hand, most other manufacturers have plunged into the development of three wavelength light sources, which have blue, green and red phosphors that are excited by ultraviolet light emitted by an inorganic ultraviolet chip. If the ratio of the three primary color light is appropriate, the mixed light is a white light. There are numerous phosphors available, but it is necessary to take the manufacturing process and the emission strength into account.

On the other hand, a method has been proposed, which chooses a special phosphor capable of emitting white light under excitation of ultraviolet light. This special phosphor can emit white light without the need of mixing several color lights. However, there are rare kinds of this special phosphor and thus cannot meet various requirements.

SUMMARY OF THE INVENTION

An object of the present invention is to provide an inorganic phosphor and a method for manufacturing the same, in which a sole-gel method is used to synthesize a novel red-emission phosphor material, which has $Gd_2Ti_2O_7$ as the host and the rare earth element $Eu^{3+}$ and the elements vanadium (V) and sulfate (S) added as the activator to enhance the red-emission intensity.

Another object of the present invention is to provide an inorganic phosphor and a method for manufacturing the same, in which a sole-gel method is used to synthesize a novel white-emission phosphor material, which has $Gd_2Ti_2O_7$ as the host and the cheaper elements V and S added as the activator.

To achieve the above objects, the present invention provides an inorganic phosphor with a chemical composition formula of $Gd_{(2-x-y)}Ti_{(2-x-y)}O_7$:$Eu_x$, $V_y$, $S_y$, where x is between 0.005~0.05 and is preferred to be 0.02 and y is between 0.03~0.3 and is preferred to be 0.06. This inorganic phosphor is a red-emission phosphor (gadolinium titanium oxide doped with $Eu^{3+}$, V and S, $Gd_2Ti_2O_7$: $Eu^{3+}$, V, S). Because the elements S and V are added, the emission wavelength is primarily 615 nm, and the red-emission intensity is enhanced. The CIE chromaticity value is X=0.5706 and Y=0.3338, and the color temperature is 1800 K. Through addition of the elements S and V, a well red-emission property can be found after sintering at 400~1000° C.

The present invention provides a method for manufacturing an inorganic phosphor comprising the steps of: mixing gadolinium chloride ($GdCl_3$) and titanium bis (ammonium-lactato)dihydroxide (TBD) to obtain a mixture solution; mixing europium chloride ($EuCl_3$) and vanadium oxide sulfate pentahydrate ($VOSO_4$) into the mixture solution to carry out a condensation reaction so as to obtain a phosphor precursor; and drying, sintering and crystallizing said phosphor precursor into a red-emission gadolinium titanium oxide phosphor doped with $Eu^{3+}$, V and S, i.e., $Gd_2Ti_2O_7$: $Eu^{3+}$, V, S.

The present invention also provides an inorganic phosphor with a chemical composition formula of $Gd_{(2-x)}Ti_{(2-x)}O_7$: $V_x$, $S_x$, where x is between 0.03~0.3 and is preferred to be 0.06. This inorganic phosphor is a white-emission phosphor with the elements V and S as the primary activators (gadolinium titanium oxide doped with V and S, i.e., $Gd_2Ti_2O_7$: V, S). This phosphor is a single material capable of emitting white light without the need of mixing several color lights. The emission wavelengths are 483 nm, 573 nm and 612 nm. The CIE chromaticity value is X=0.3702 and Y=0.3729, and the color temperature is 4800 K.

The present invention also provides a method for manufacturing an inorganic phosphor comprising the steps of: mixing $GdCl_3$ and TBD to obtain a mixture solution; adding $VOSO_4$ in the mixture solution to carry out a condensation reaction so as to obtain a phosphor precursor; and drying, sintering and crystallizing said phosphor precursor into a white-emission gadolinium titanium oxide phosphor doped with V and S, i.e., $Gd_2Ti_2O_7$: V, S.

The various objects and advantages of the present invention will be more readily understood from the following detailed description when read in conjunction with the appended drawings, in which:

DETAILED DESCRIPTION OF THE PREFERRED EMBODIMENTS

The embodiments in the present invention make use of a sol-gel method to synthesize a novel inorganic phosphor.

In the sol-gel method, a metal alkoxide is usually used as the precursor. After hydrolysis and condensation, condensed sol is produced. After aging of the condensed sol, 3D tiny structure gel is formed. The gel is then dried to remove moisture and organic groups under low temperatures to get powders. The sol-gel method is characterized in that metal alkoxide is used as the raw material to avoid contaminant of negative ions. The powders have a higher purity, a narrower distribution of particle diameter and uniform composition, are manufactured under low temperatures. It is easy to modify or adjust the particle composition during manufacturing. Moreover, the processing of dipping or coating can be carried out in the colloid state.

According to a first embodiment of the present invention, a red-emission phosphor has a chemical composition formula of $Gd_{(2-x-y)}Ti_{(2-x-y)}O_7:Eu_x, V_y, S_y$, where x is between 0.005~0.05 and is preferred to be 0.02 and y is between 0.03~0.3 and is preferred to be 0.06.

Figure 1:
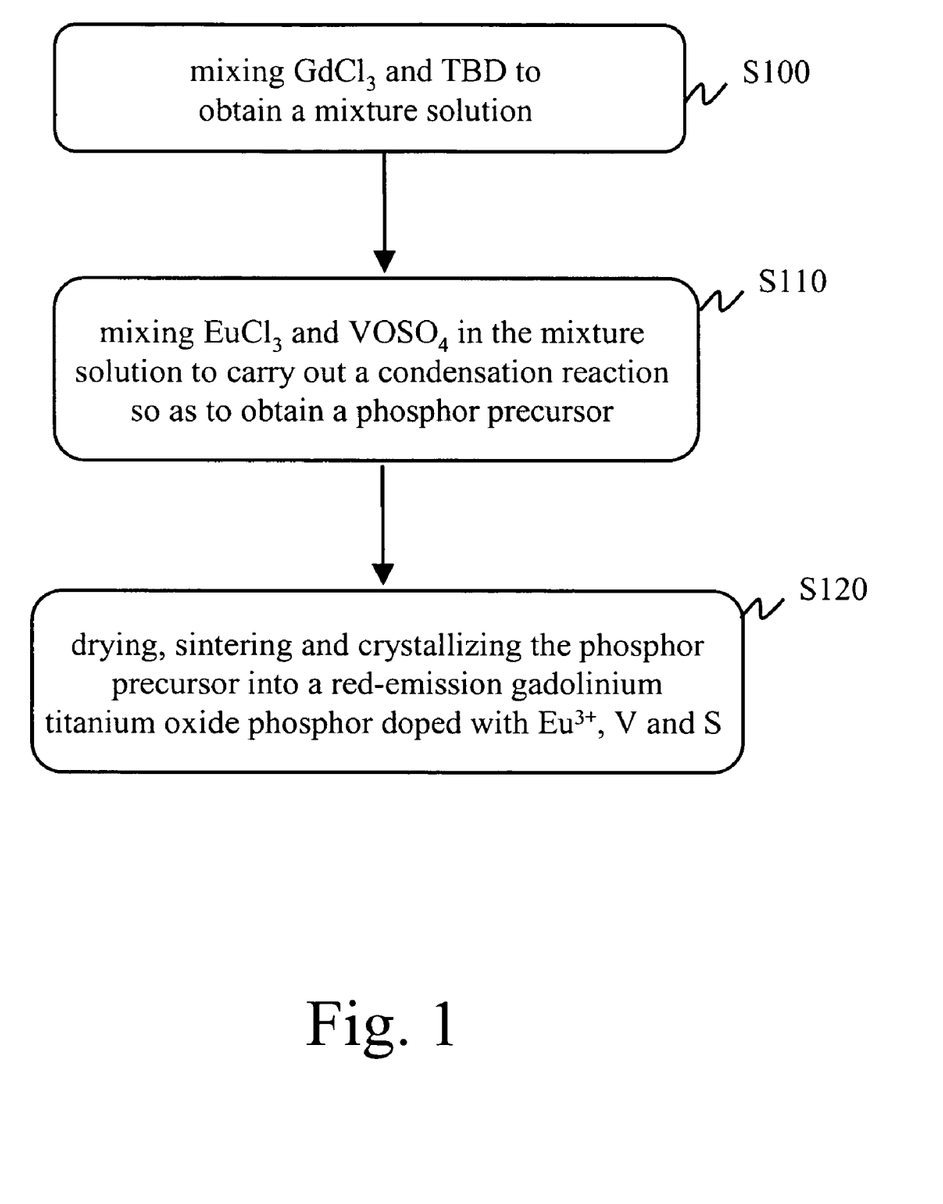
FIG. 1 is a flowchart of the method for manufacturing a red-emission phosphor according to a first embodiment of the present invention.

FIG. 1 is a flowchart of the method for manufacturing a red-emission phosphor according to the first embodiment of the present invention. The method comprises the following steps. First, $GdCl_3$ and TBD are mixed to obtain a mixture solution (Step S100). Next, $EuCl_3$ and $VOSO_4$ are mixed in the mixture solution to carry out a condensation reaction so as to obtain a phosphor precursor (Step S110). Finally, the phosphor precursor is dried and sintered at high temperatures to crystallize into a red-emission gadolinium titanium oxide phosphor doped with $Eu^{3+}$, V and S, i.e., $Gd_2Ti_2O_7: Eu^{3+}$, V, S (Step S120).

In Step S100, this embodiment exploits the sol-gel method. $GdCl_3$ of 1.38 g and TBD of 2.94 g are dissolved in deionized water of 10 ml in an equal molar ratio and is stirred in a reactor that rotates at 300 rpm to obtain a mixture solution. The reaction time is 1 hour long.

In Step S110, $EuCl_3$ of 0.02~0.2 g and $VOSO_4$ of 0.05~0.5 g are mixed in the above mixture solution to react at room temperature and atmosphere, and the solution is continually stirred for 6 hours. Next, the pH value was kept at 8~12 by titration of NaOH (0.1~1 M) for continual reaction for 8 hours. After a total 12 hours of condensation reaction, microcrystalline crystals are formed at the room temperature. The produced phosphor precursor is then collected using a high-speed centrifuge machine that rotates at 11000 rpm for 30 mins.

In Step S120, a 120° C. oven is used to dry the phosphor precursor. Next, the phosphor precursor is sent into a box-shaped furnace with a ramp rate of 10° C./min. When the sintering temperature rises gradually, the degree of crystallization starts to increase. The material structure is $Gd_2Ti_2O_7: Eu^{3+}$, V, S, i.e., the red-emission gadolinium titanium oxide phosphor doped with $Eu^{3+}$, V and S. At the sintering temperature from 400~1000° C. (i.e., at the sintering temperature 400, 500, 600, 700, 800, 900, 1000° C.), the emission intensity of the red-emission phosphor starts to rise. When the predetermined temperature is reached, the temperature is kept for 4 hours or more to allow the crystal lattice to regularly arrange again. The sintering process is performed in air. Afterwards, the furnace is naturally cooled to room temperature.

Figure 2:
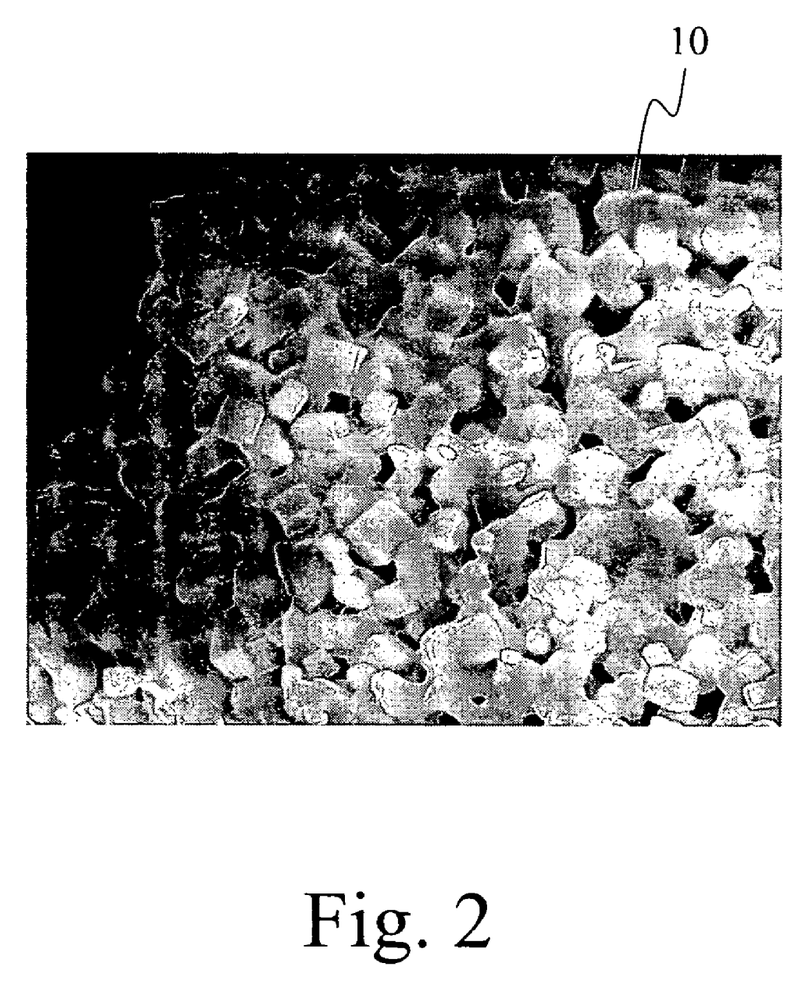
FIG. 2 is a SEM photograph of the red-emission phosphor according to the first embodiment of the present invention.
Figure 3:
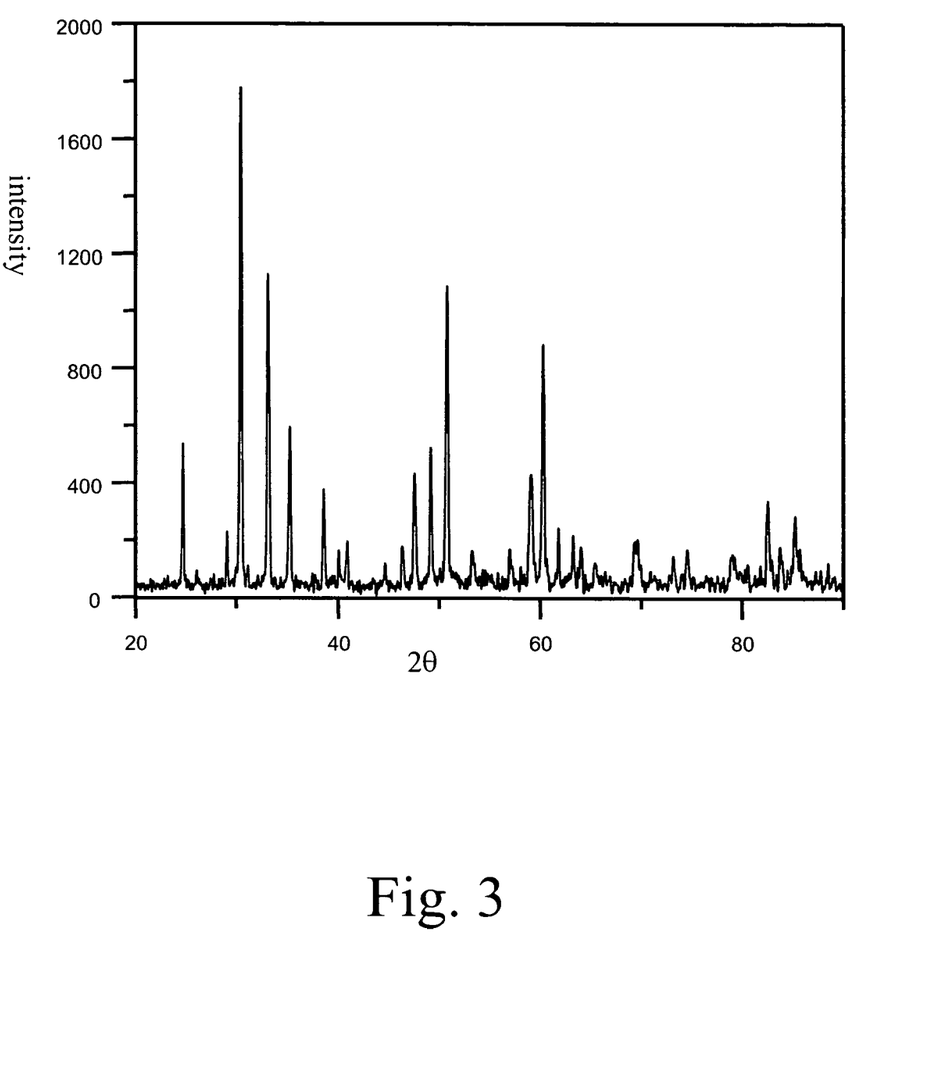
FIG. 3 is an XRD diagram of the red-emission phosphor according to the first embodiment of the present invention.
Figure 4:
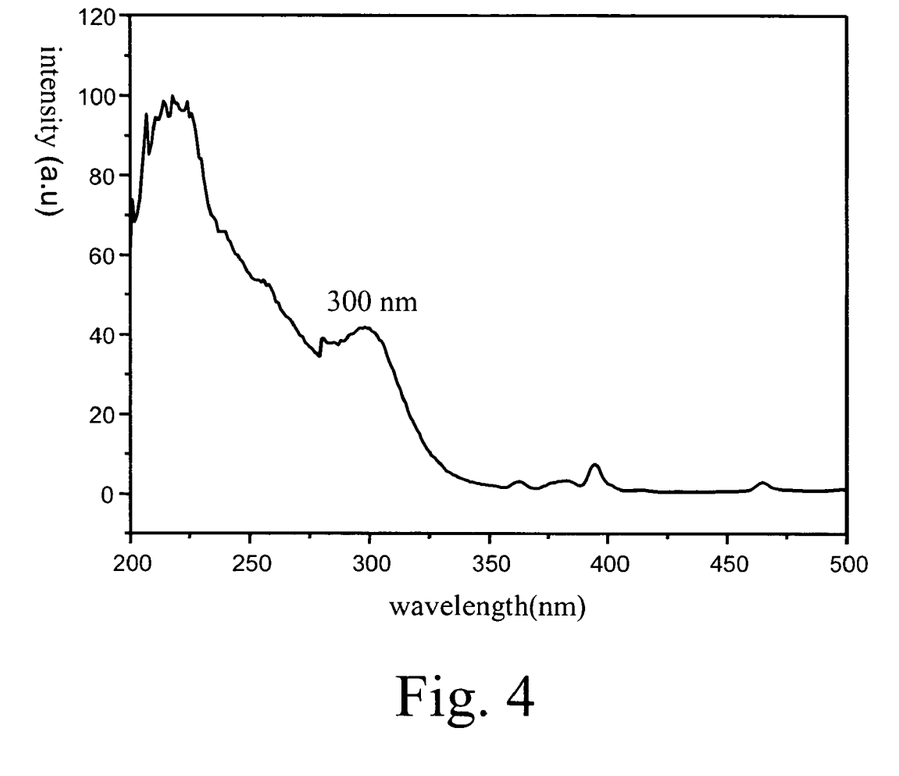
FIG. 4 and FIG. 5 are a PL excitation wavelength characteristic diagram and a PL emission wavelength characteristic diagram at 1000° C. of the phosphor undoped with the elements S and V, respectively, according to the first embodiment of the present invention.
Figure 5:
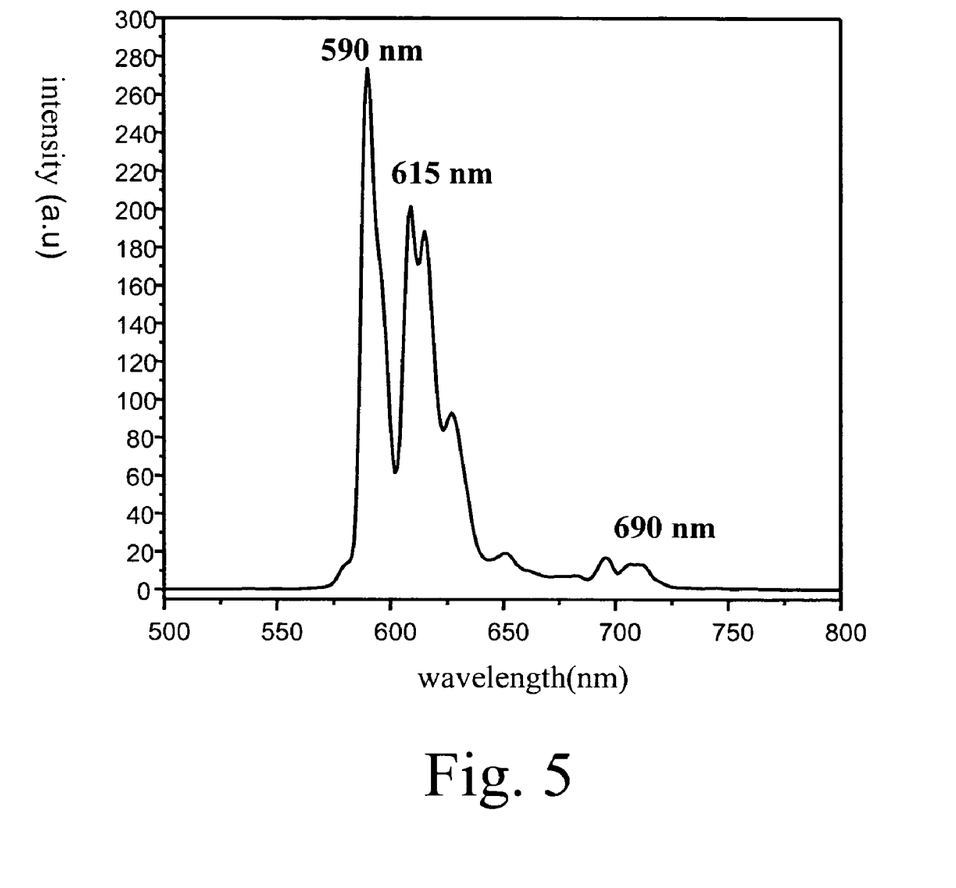
Figure 6:
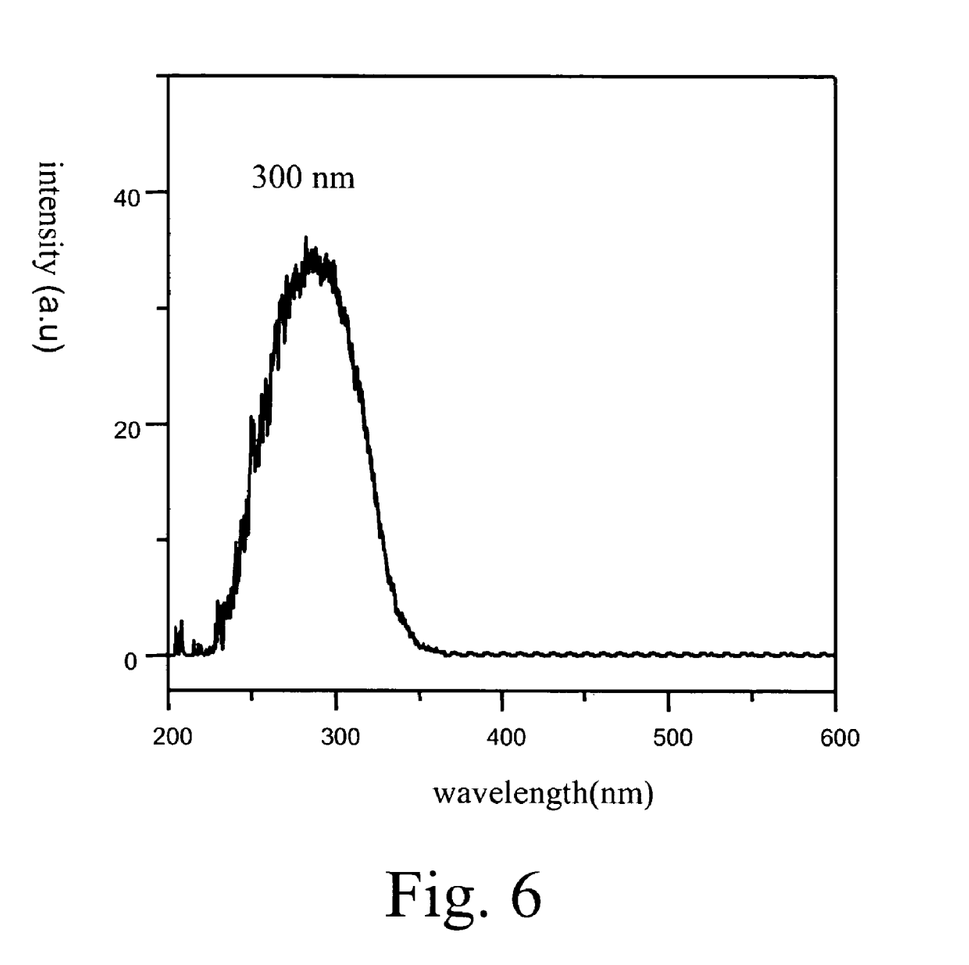
FIG. 6 to FIG. 8 are a PL excitation wavelength characteristic diagram, a PL emission wavelength characteristic diagram at 1000° C., and a PL emission wavelength characteristic diagram at 400° C. of the phosphor doped with the elements S and V, respectively, according to the first embodiment of the present invention.
Figure 7:
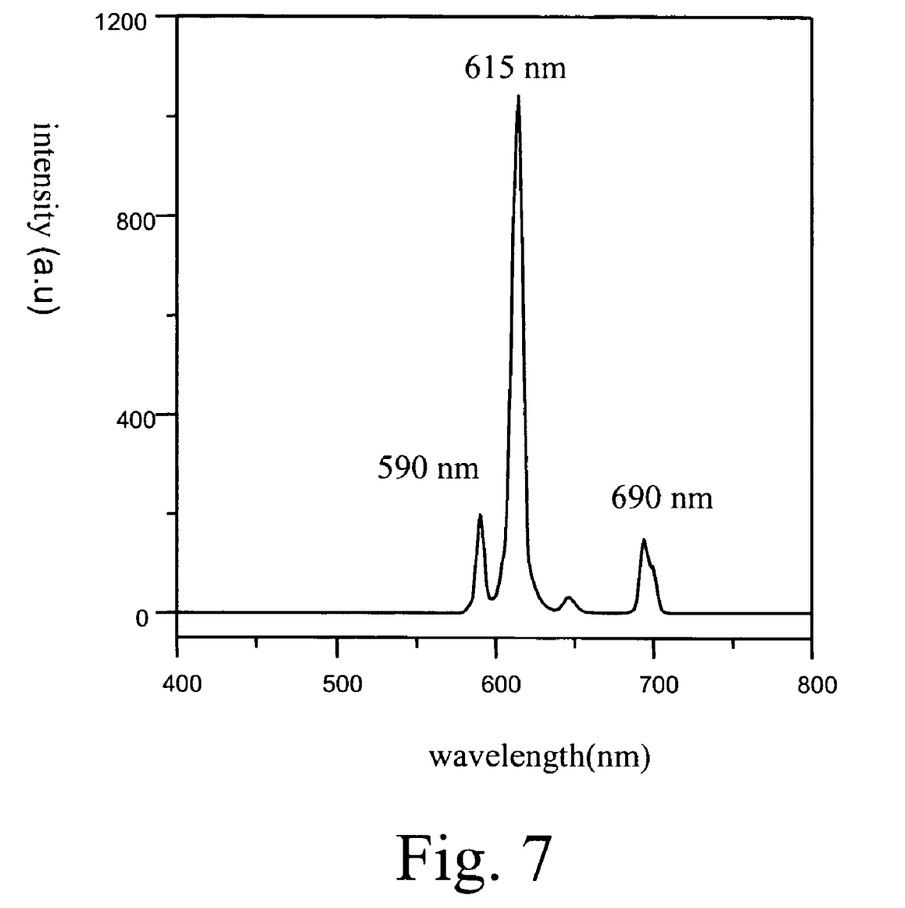
Figure 8:
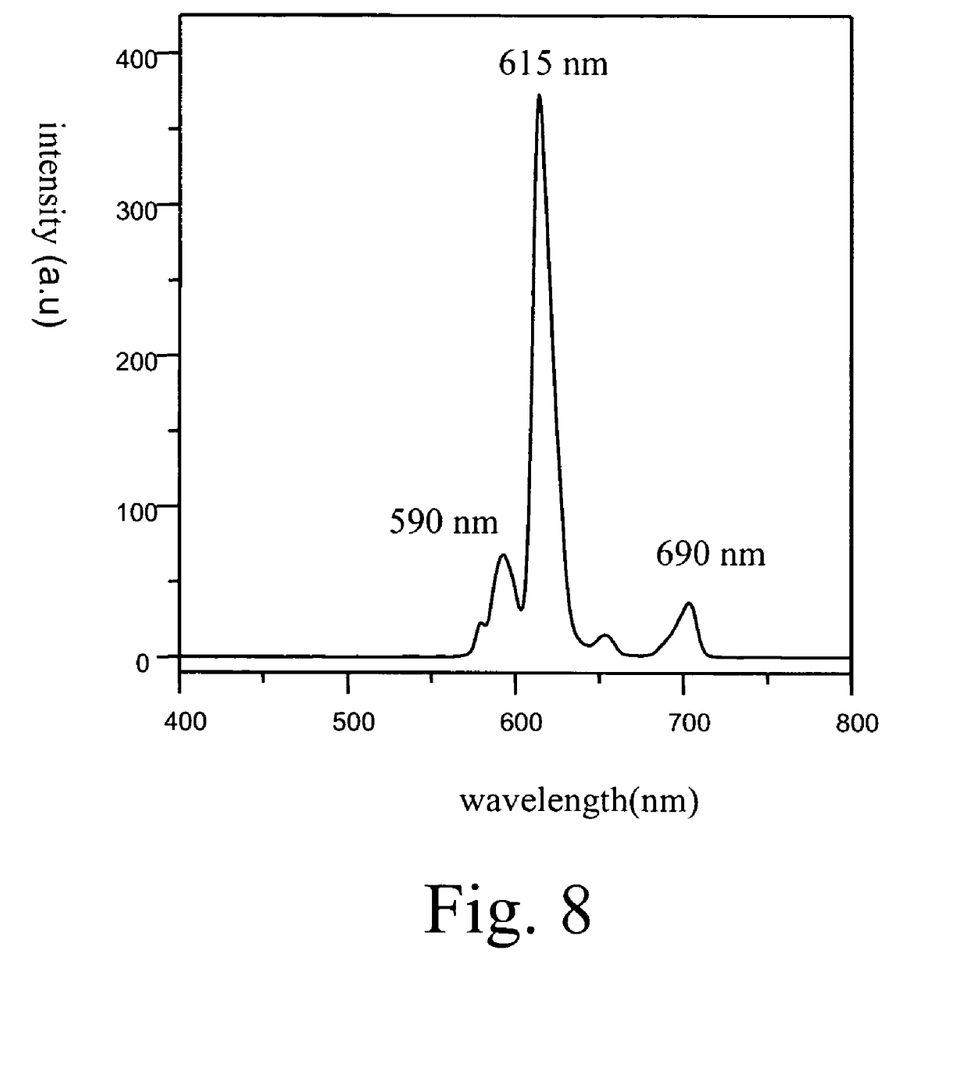
Figure 9:
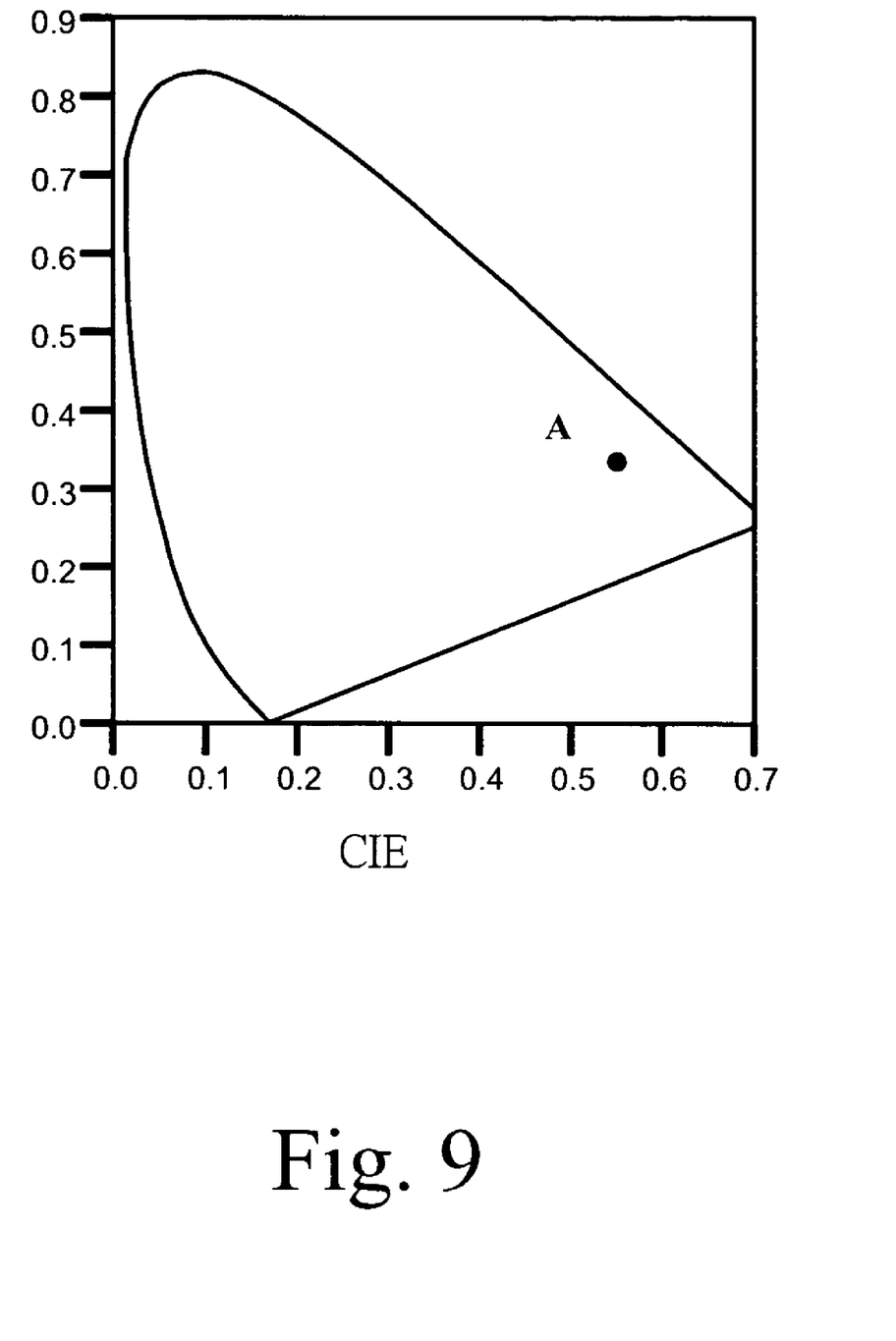
FIG. 9 is a CIE chromaticity diagram of the red-emission phosphor according to the first embodiment of the present invention.

The present invention also carries out identification and analysis of several characteristics of the red-emission phosphor made by this embodiment to verify the inorganic phosphor and the method for manufacturing the same. FIG. 2 is a SEM photograph of the red-emission phosphor according to the first embodiment of the present invention. FIG. 3 is an XRD diagram of the red-emission phosphor according to the first embodiment of the present invention. FIG. 4 and FIG. 5 are a PL excitation wavelength characteristic diagram and a PL emission wavelength characteristic diagram at 1000° C. of the phosphor undoped with the elements S and V, respectively, according to the first embodiment of the present invention. FIG. 6 to FIG. 8 are a PL excitation wavelength characteristic diagram, a PL emission wavelength characteristic diagram at 1000° C., and a PL emission wavelength characteristic diagram at 400° C. of the phosphor doped with the elements S and V, respectively, according to the first embodiment of the present invention. FIG. 9 is a CIE chromaticity diagram of the red-emission phosphor according to the first embodiment of the present invention.

As revealed by the results, the red-emission intensity of the red-emission phosphor in this embodiment is enhanced through the addition of the elements V and S. Secondly, a well red-emission property of the red-emission phosphor ($Gd_2Ti_2O_7: Eu^{3+}$, V, S) can be found after sintering at 400~1000° C. Moreover, the emission wavelength of the red-emission phosphor is 615 nm. The CIE chromaticity value A is X=0.5706, Y=0.3338, and Z=0.0909 (FIG. 9). From the colorimetry analysis, the color temperature is 1800 K.

According to a second embodiment of the present invention, a white-emission phosphor has a chemical composition formula of $Gd_{(2-x)}Ti_{(2-x)}O_7: V_x, S_x$, where x is between 0.03~0.3 and is preferred to be 0.06.

Figure 10:
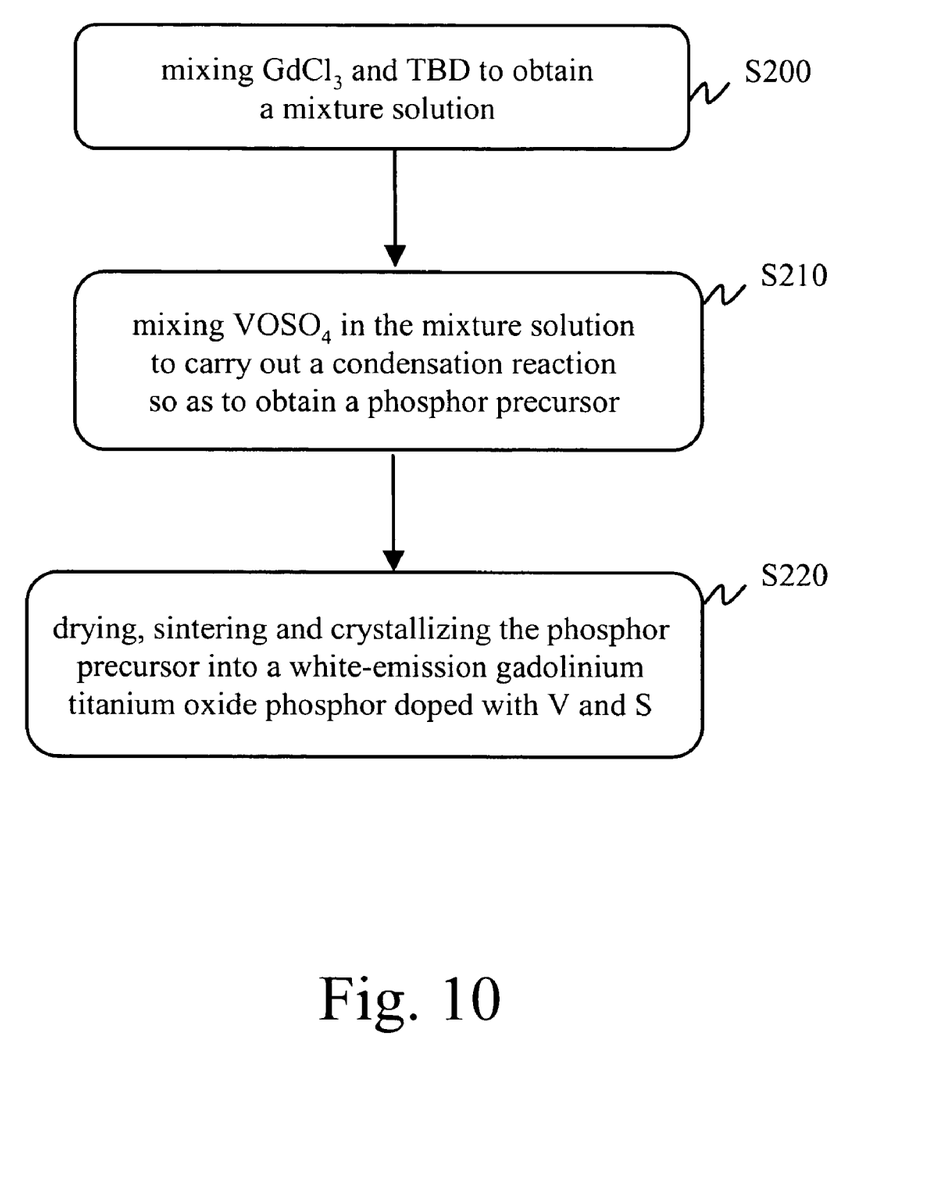
FIG. 10 is a flowchart of the method for manufacturing a white-emission phosphor according to a second embodiment of the present invention.

FIG. 10 is a flowchart of the method for manufacturing a white-emission phosphor according to the second embodiment of the present invention. The method comprises the following steps. First, GdCl$_3$ and TBD are mixed to obtain a mixture solution (Step S200). Next, VOSO$_4$ is mixed in the mixture solution to carry out a condensation reaction so as to obtain a phosphor precursor (Step S210). Finally, the phosphor precursor is dried and sintered at high temperatures to crystallize into a white-emission gadolinium titanium oxide phosphor doped with V and S, i.e., Gd$_2$Ti$_2$O$_7$: V, S (Step S220).

In Step S200, this embodiment exploits the sol-gel method. GdCl$_3$ of 1.38 g and TBD of 2.94 g are dissolved in deionized water of 10 ml in an equal molar ratio and is stirred in a reactor that rotates at 300 rpm to obtain a mixture solution. The reaction time is 1 hour long.

In Step S210, VOSO$_4$ of 0.05~0.5 g is mixed in the above mixture solution to react at the room temperature and the atmospheric pressure for 2 hours, and the solution is continually stirred for 6 hours. Next, the pH value was kept at 8~12 by titration of NaOH (0.1~1 M) for continual reaction for 8 hours. After a total 12 hours of condensation reaction, microcrystalline crystals are formed at the room temperature. The produced phosphor precursor is then collected using a high-speed centrifuge machine that rotates at 11000 rpm for 30 mins.

In Step S220, a 120° C. oven is used to dry the phosphor precursor. Next, the phosphor precursor is sent into a box-shaped furnace with a ramp rate of 10° C./min. When the sintering temperature rises gradually, the degree of crystallization starts to increase. The material structure is Gd$_2$Ti$_2$O$_7$: V, S. i.e., the white-emission gadolinium titanium oxide phosphor doped with V and S. At the sintering temperature of 1000° C., the emission intensity of the white-emission phosphor starts to rise. When the predetermined temperature is reached, the temperature is kept for 4 hours or more to allow the crystal lattice to regularly arrange again. The sintering process is performed in air. Afterwards, the furnace is naturally cooled to the room temperature.

Figure 11:
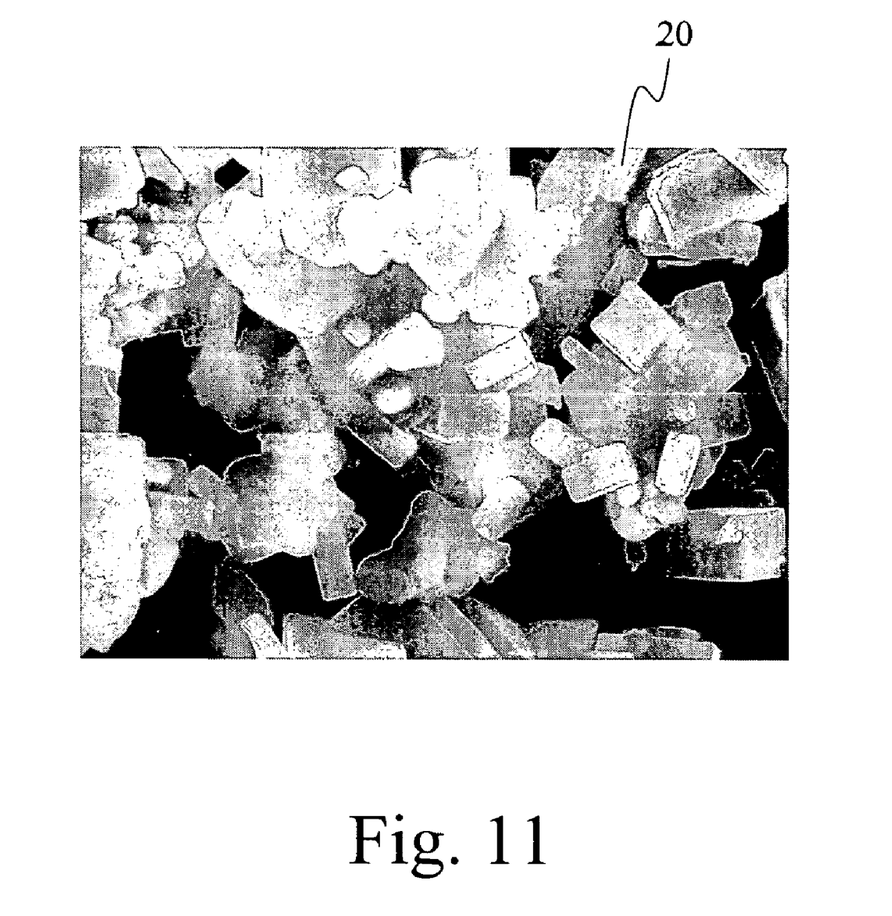
FIG. 11 is a SEM photograph of the white-emission phosphor according to the second embodiment of the present invention.
Figure 12:
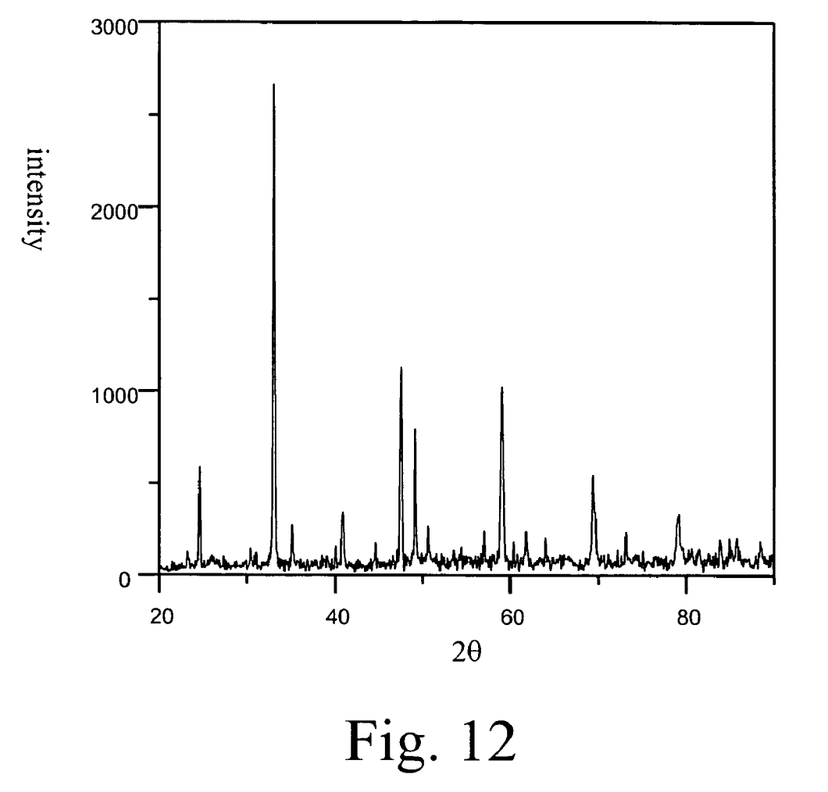
FIG. 12 is an XRD diagram of the white-emission phosphor according to the second embodiment of the present invention.
Figure 13:
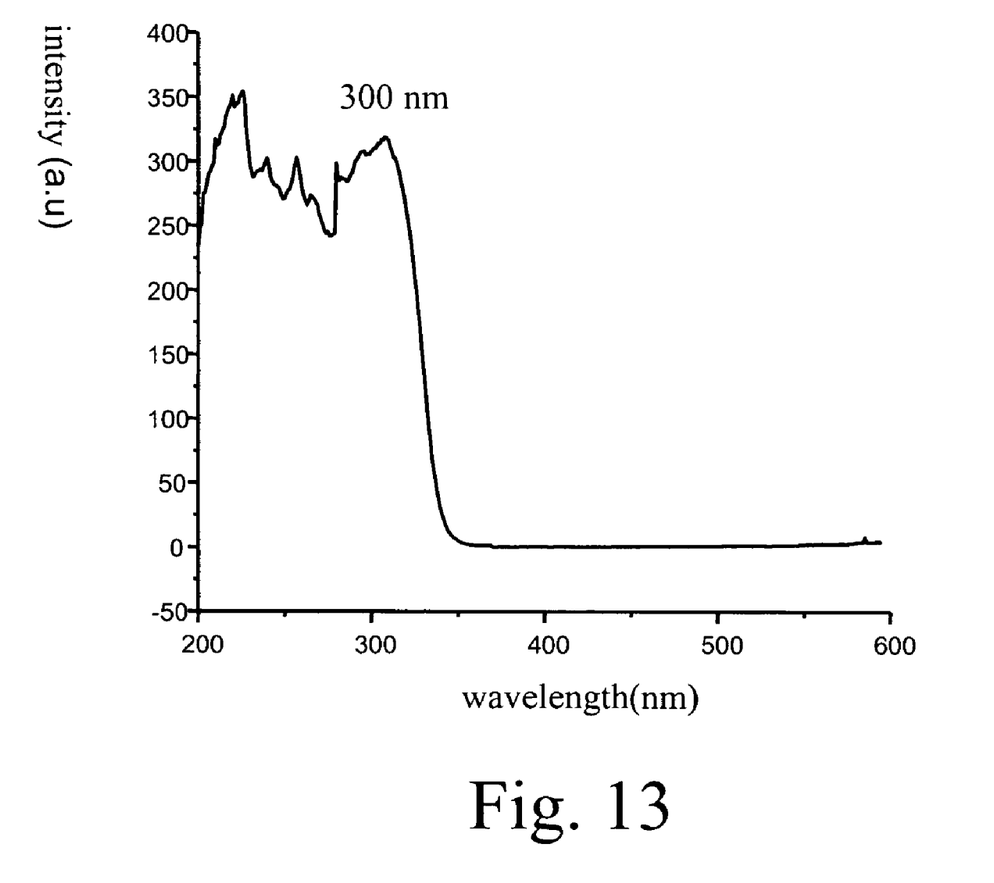
FIG. 13 and FIG. 14 are a PL excitation wavelength characteristic diagram and a PL emission wavelength characteristic diagram at 1000° C. of the white-emission phosphor, respectively, according to the second embodiment of the present invention.
Figure 14:
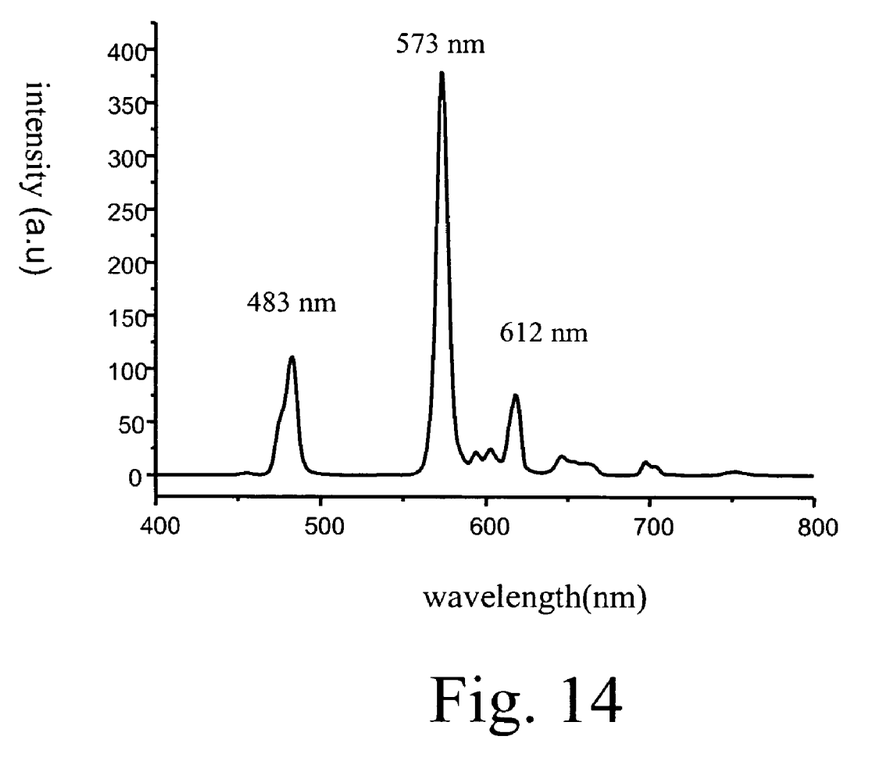
Figure 15:
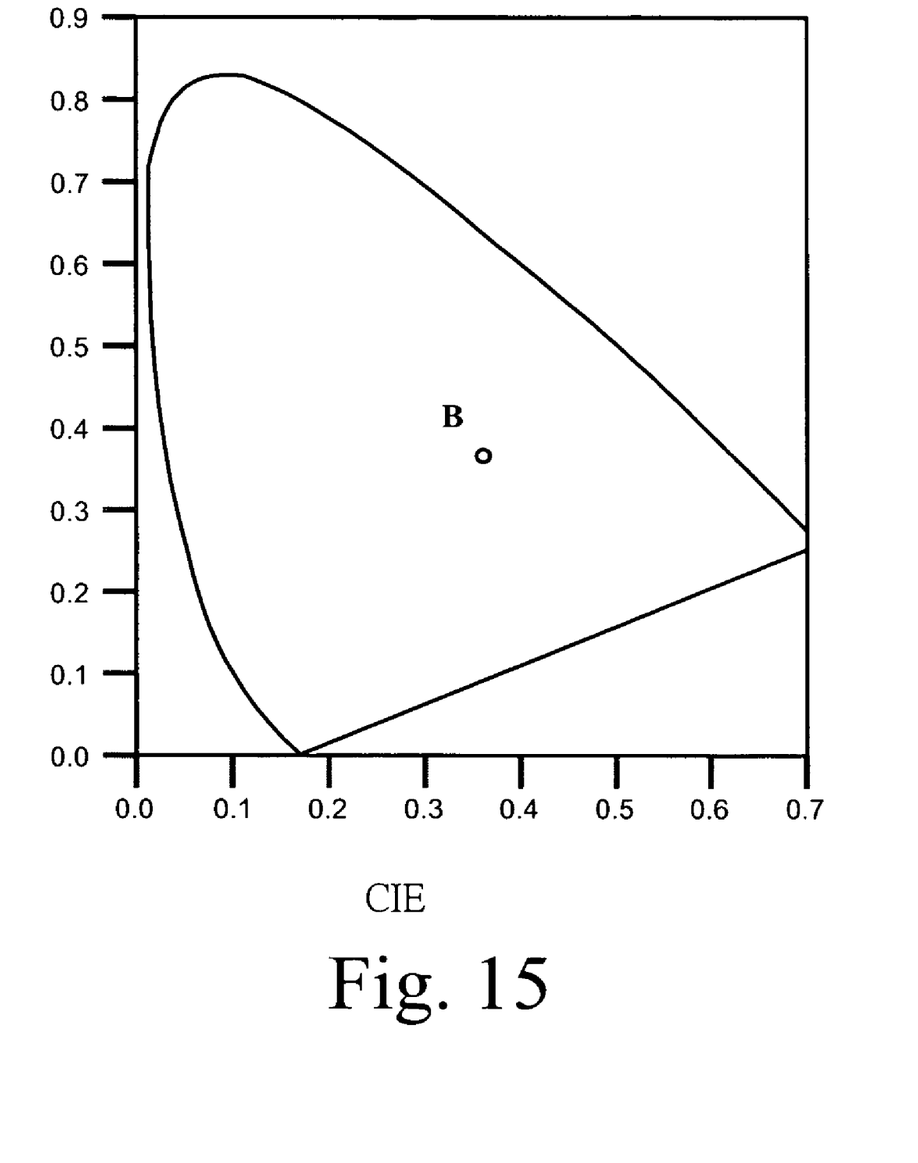
FIG. 15 is a CIE chromaticity diagram of the white-emission phosphor according to the second embodiment of the present invention.

The present invention also carries out identification and analysis of several characteristics of the white-emission phosphor made by this embodiment to verify the inorganic phosphor and the method for manufacturing the same. FIG. 11 is a SEM photograph of the white-emission phosphor according to the second embodiment of the present invention. FIG. 12 is an XRD diagram of the white-emission phosphor according to the second embodiment of the present invention. FIG. 13 and FIG. 14 are a PL excitation wavelength characteristic diagram and a PL emission wavelength characteristic diagram at 1000° C. of the white-emission phosphor, respectively, according to the second embodiment of the present invention. FIG. 15 is a CIE chromaticity diagram of the white-emission phosphor according to the second embodiment of the present invention.

As revealed by the results, the elements S and V replace the expensive rare earth element Eu$^{3+}$ to be used as the primary active sites in the white-emission phosphor. Moreover, the emission wavelengths of the white-emission phosphor are 483 nm, 573 nm and 612 nm. The CIE chromaticity value B is X=0.3702, Y=0.3729, and Z=0.2596 (FIG. 15). From the colorimetry analysis, the color temperature is 4800 K.

To sum up, the present invention provides an inorganic phosphor and a method for manufacturing the same. By adding the elements S and V, part energy at the emission wavelength 588 nm of the original Gd$_2$Ti$_2$O$_7$: Eu$^{3+}$ is transferred to emission wavelength 612 nm, and a novel red-emission phosphor, Gd$_2$Ti$_2$O$_7$: Eu$^{3+}$, V, S is obtained. Moreover, by replacing the expensive rare earth element Eu$^{3+}$ with the elements V and S and exciting with an excitation wavelength 300 nm, a white-emission phosphor Gd$_2$Ti$_2$O$_7$: Eu$^{3+}$, V, S with emission wavelengths 483 nm, 573 nm and 612 nm is obtained.

Furthermore, in the red-emission phosphor provided by the present invention, the amount of the expensive rare earth element Eu$^{3+}$ is reduced by 30% through the addition of the elements S and V. In the white-emission phosphor provided by the present invention, the elements S and V totally replace the rare earth element Eu3+ as new activators. Therefore, the amount of precious metal and rare earth element can be reduced to lower the production cost, hence possessing a good development potential in future research and commercialization courses.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. An inorganic phosphor with a chemical composition formula of Gd$_{(2-x-y)}$Ti$_{(2-x-y)}$O$_7$:Eu$_x$, V$_y$, S$_y$, where x is between 0.005~0.05 and y is between 0.03~0.3.

2. The inorganic phosphor of claim 1, wherein x in said composition is 0.02.

3. The inorganic phosphor of claim 1, wherein y in said composition is 0.06.

4. The inorganic phosphor of claim 1, wherein said inorganic phosphor is a single material capable of emitting red light after excited by ultraviolet light.

5. The inorganic phosphor of claim 4, wherein the primary emission wavelength of said inorganic phosphor is 300 nm.

6. A method for manufacturing an inorganic phosphor comprising the steps of:
   mixing GdCl$_3$ and TBD to obtain a mixture solution;
   mixing EuCl$_3$ and VOSO$_4$ in said mixture solution to carry out a condensation reaction so as to obtain a phosphor precursor; and
   drying, sintering and crystallizing said phosphor precursor into a red-emission gadolinium titanium oxide phosphor doped with Eu$^{3+}$, V and S.

7. The method for manufacturing an inorganic phosphor of claim 6, wherein in said step of mixing GdCl$_3$ and TBD, the GdCl$_3$ and TBD are mixed in an equal molar ratio, and VOSO$_4$ of 0.05~0.5 g is added into said mixture solution.

8. The method for manufacturing an inorganic phosphor of claim 6, wherein said condensation reaction is carried out under a pH of 8~12.

9. The method for manufacturing an inorganic phosphor of claim 6, wherein the sintering temperature in said step of sintering said phosphor precursor is 400~1000° C.

10. An inorganic phosphor with a chemical composition formula of Gd$_{(2-x)}$Ti$_{(2-x)}$O$_7$: V$_x$, S$_x$, where x is between 0.005~0.05.

11. The inorganic phosphor of claim 10, wherein x in said composition is 0.06.

12. The inorganic phosphor of claim 10, wherein said inorganic phosphor is a single material capable of emitting white light after excited by ultraviolet light.

13. The inorganic phosphor of claim 12, wherein the primary emission wavelength of said inorganic phosphor is 300 nm.

14. A method for manufacturing an inorganic phosphor comprising the steps of:

mixing $GdCl_3$ and TBD to obtain a mixture solution;

mixing $VOSO_4$ in said mixture solution to carry out a condensation reaction so as to obtain a phosphor precursor; and drying, sintering and crystallizing said phosphor precursor into a white-emission gadolinium titanium oxide phosphor doped with V and S.

15. The method for manufacturing an inorganic phosphor of claim 14, wherein in said step of mixing $GdCl_3$ and TBD, the $GdCl_3$ and TBD are mixed in an equal molar ratio, and $VOSO_4$ of 0.05~0.5 g is added into said mixture solution.

16. The method for manufacturing an inorganic phosphor of claim 14, wherein said condensation reaction is carried out under a pH of 8~12.

17. The method for manufacturing an inorganic phosphor of claim 14, wherein the sintering temperature in said step of sintering said phosphor precursor is 1000° C.

* * * * *